United States Patent [19]

Huckins et al.

[11] 4,303,529

[45] Dec. 1, 1981

[54] MULTI-CHROMATOGRAPHIC MATERIALS

[75] Inventors: James N. Huckins; David L. Stalling, both of Columbia; Jimmie D. Petty, Harrisburg; Lawrence M. Smith, Columbia, all of Mo.

[73] Assignee: The United States of America as represented by the Secretary of the Interior, Washington, D.C.

[21] Appl. No.: 184,851

[22] Filed: Sep. 8, 1980

[51] Int. Cl.³ .......................................... B01D 15/08
[52] U.S. Cl. .................................. 210/635; 210/656; 55/67; 252/428
[58] Field of Search ..................... 210/635, 656, 659; 55/67, 386; 252/428, 444

[56] References Cited

U.S. PATENT DOCUMENTS

| | | | |
|---|---|---|---|
| 3,420,709 | 1/1969 | Barrett, Jr. et al. ................ | 210/502 |
| 3,997,472 | 12/1976 | Driscoll .......................... | 252/428 X |
| 4,081,402 | 3/1978 | Levy et al. ......................... | 252/428 |
| 4,102,816 | 7/1978 | Stalling et al. ..................... | 252/428 |
| 4,135,943 | 1/1979 | Morishita et al. ............... | 252/428 X |
| 4,216,083 | 8/1980 | Dale .................................... | 210/635 |

OTHER PUBLICATIONS

Introduction to Modern Liquid Chromatography by Snyder et al., John Wiley & Sons New York, p. 349, 1974.

Primary Examiner—John Adee
Attorney, Agent, or Firm—William S. Brown; Donald A. Gardiner

[57] ABSTRACT

A packing media for column chromatography having multiple separation characteristics comprises adsorbent carbon powder particles adhered to the surfaces of individual particles of a molecular size exclusion gel polymer.

4 Claims, 2 Drawing Figures

MULTI-CHROMATOGRAPHIC MATERIALS

TECHNICAL FIELD

The present invention relates to multi-chromatographic materials and, more particularly, to packing media for use in chromatographic columns consisting essentially of powdered carbon dispersed on and adhered to a size exclusion gel polymer.

BACKGROUND ART

Chromatography has been in widespread use for the fractionation, separation and analysis of biological and/or ecological materials. Various chromatographic techniques in use have included adsorption chromatography, ion exchange chromatography, gel permeation chromatography, gas chromatography, paper chromatography and thin-layer chromatography. In the ecological field, particularly, several of the same or different chromatographic techniques are often required to separate the complex mixtures of organic compounds encountered in laboratory samples to be analyzed.

It has occasionally been found that certain compounds or classes of compounds, when present in unknown mixtures, interfere with the normal separation and analysis of bio-affecting agents anticipated as being components of the mixture. For example, it has been very troublesome to completely separate toxic, planar polychlorinated biphenyl (PCB) components from mixtures which include other aromatic industrial chemicals together with pesticides, herbicides, natural biological fluids and fatty tissue. Moreover, the toxic, non-planar chlorinated aromatic compounds found as pollutants in the environment, namely, the pesticides KEPONE (chlordecone) and mirex, are typically difficult to chromatographically fractionate when found in admixture with certain planar components. Such non-planar pollutants are not retained by activated charcoal or other conventional adsorbents utilized in column chromatography. Separation and analysis has, however, been achieved by means of molecular size exculsion, or gel permeation, polymers. These materials are cross-linked copolymer gels which function like sponges on a micro scale. The size of the gel pores are controlled by the degree of cross-linking so that only certain molecular sizes can be retained by the gel while all other compounds of larger molecular size are excluded.

The chlorine substituted naphthalenes, dibenzodioxins and dibenzofurans have been found to be very hazardous to the environment because of their high toxicity to fish and animal life at concentrations as low as 1 ppm. These planar polynuclear aromatic compounds are preferentially adsorbed by passage through adsorption columns containing activated charcoal powders, often in admixture with dispersive agents or filter aids such as sand, magnesia, diatomaceous earth, and glass powder. Polyurethane foam has also been employed as an inert support for the carbon material in such columns. Such adsorbents are more fully discussed in U.S. Pat. Nos. 4,102,816 and 4,110,344 which issued on July 25 and Aug. 29, 1978, to Stalling et al. However, such supports, dispersive agents, and filter aids do not enhance chromatographic separation and, consequently, a minimum of two columns are normally required for analyses where both planar and non-planar aromatics are suspected as being present.

DISCLOSURE OF THE INVENTION

It is an object of this invention to provide a chromatographic material which is capable of multiple chromatographic effects.

It is another object of this invention to provide a packing medium for column chromatography which exhibits the separation characteristics of more than one adsorbent.

It is yet another object of this invention to provide a method of fabricating a multiple effect chromatographic medium for column chromatography.

It is a further object of this invention to provide one-step fractionation and enrichment media for the analysis of planar and non-planar polynuclear aromatic hydrocarbon compounds.

Other objects and advantages will become apparent from the following description and the appended claims considered together with the accompanying drawings.

Briefly stated, in accordance with the aforesaid objects, it has been discovered that a material consisting essentially of powdered carbon or charcoal adhered to a molecular size exclusion polymer results in a packing medium for column chromatography having the separation characteristics of both materials in a single configuration. The multi-chromatographic materials of this invention find particular applicability in the purification of organic compounds and in the removal or enrichment of contaminants present in organic extracts.

BEST MODE FOR CARRYING OUT THE INVENTION

Figure 1:
FIG. 1 illustrates, at 1000X magnification, a size exclusion polymer particle having powdered carbon adhered thereto in accordance with the present invention.

The molecular size exclusion polymers useful in the practice of this invention are widely used in liquid chromatography, particularly in gel permeation chromatography (also known as gel filtration) for synthetic polymer fractionations requiring organic solvents. Separation primarily depends on the molecular sizes of the solutes in the solution being analyzed and the availability of comparable or larger pore sizes in the polymeric packing material contained in the column. The polarity of the solute molecules appears to be of minor importance. In operation, the smaller solute molecules pass comparatively slowly down the column because they are continually entering and exiting the pores of the polymeric packing material, resulting in a longer effective path length. The larger molecules are totally excluded from the pores so they travel more rapidly and emerge first from the column.

A wide variety of gel polymers have been used to effect molecular size separations, the most common of which are the cross-linked polystyrenes. For the practice of this invention, cross-linked styrene-divinyl benzene copolymer particles are preferred. The pore sizes of these materials can be carefully controlled by the extent to which the copolymers are cross-linked. Hence, the higher the degree of cross-linking, the smaller the resultant pore size and, consequently, the more selective to compounds of smaller molecular structure the materials become. Generally, the pore size of the cross-linked gel particles vary from about 10 to about 5000 Å. Pore sizes in the neighborhood of 2000 Å have been found to be preferred for the separations contemplated by this invention.

Size exclusion polymers are commercially available from a number of sources in the form of small spheres or beads, usually within a particle size range of 200 to 400 mesh. A series of styrene-divinyl benzene copolymer gels is manufactured by Bio-Rad Laboratories, Inc. under the designation Bio-Beads and is ideally suited for use in this invention. In fact, as shown in Example II below, Bio-Beads S-X3 have provided excellent analytical results. However other polystryene containing gel polymers capable of functioning as size exclusion polymers, preferably structurally similar to Bio-Beads, may also be satisfactorily used. Exemplary of other useful polymers are: Styragel and $\mu$ Styragel from Waters Associates, AMBERLITE XAD-2 and XAD-4 from Rohm and Haas Co., and MicroPAK TSK Gel Type H from Applied Science Laboratories, Inc.

Carbon adsorbents, viz., activated charcoals, rely upon the differences in the polarities of the solute components of the mixture being sampled and in their relative adsorptivities on the stationary phase of the column as the primary factors leading to separation. Hence, the attractive forces existing between the solute molecules and the column adsorbent retard the movement of the solutes down the column to differing degrees so that the least strongly adsorbed molecules are the first to emerge from the column.

Powdered charcoals have been found to be efficient adsorbents for polynuclear aromatic compounds. Although specific types of charcoals may give optimum results for adsorption of specific polynuclear aromatic compounds, almost any commercially available charcoal, such as those derived from vegetable celluloses or petroleum feedstocks, may be used in the practice of this invention. However, the powder should contain particles no larger than $70\mu$ because particles larger than $70\mu$ have been found to adhere very poorly or not at all to the polymer gel. A size range from 0.1 to about $50\mu$ has been found particularly suitable for this invention.

The carbon/size exclusion polymer materials of the present invention are easily prepared by admixing the two materials in the presence of a swelling agent. The exact nature of the binding mechanism exhibited when small carbon particles adhere to the smooth surface of the gel polymer particles is not understood, but it is believed that the phenomena may be the result of electrostatic and covalent aromatic interactions between the two surfaces. Additionally, the adherence of some of the particles may be the result of partial inclusion in the gel matrix, perhaps brought about by the action of the swelling agent on the surface of the gel particles.

It has further been observed that the extent to which the gel polymer has been cross-linked may be a consideration respecting the adhesion of the carbon particles onto the polymer surfaces. For example Bio-Beads S-X3, the member of the styrene-divinyl benzene copolymer series having 3% cross-linking, appears to hold the carbon powders more tenaciously than Bio-Beads S-X2 or S-X4, possessing 2 and 4% crosslinking, respectively.

The maximum effective loading of powdered carbon on the size exclusion polymer is approximately 5% by weight of the polymer particles. At 5% the carbon covers just about the total exposed surface of the polymer particles. Above 5% the carbon tends to pile up upon itself and hence is subject to being mechanically dislodged during normal handling of the material. On the other hand, carbon has such a high affinity for certain organic compounds, only trace amounts of carbon need be applied to the polymer particles for some analytical procedures. However, the extent of loading may also depend on the length of the column to be used, the flow rate of solvent through the column, column packing techniques employed and such other factors that conventionally affect the column resolution. In general, then, the polymer may be loaded with carbon particles within the range of from trace amounts up to about 5% based on the weight of the dry polymer particles.

For swelling the gel particles, any organic solvent which ordinarily has a swelling effect on the cross-linked gel to be employed can be used. For the cross-linked styrene-divinyl benzene copolymers, methylene chloride is preferred because both the copolymers and most of the carbon powders float on it during the early stages of processing. Some of the larger carbon powder particles do not float but this has been found to be advantageous since such larger particles provide fewer adsorption sites and do not adhere satisfactorily to the gel surfaces. As a result the larger particles often become dislodged from the polymer surfaces during subsequent handling of the material. The procedure for mixing the powdered carbon and the gel particles may be varied as needed, to suit the solvent, the method for agitating, or other applicable considerations. For example, various solvents or mixtures of solvents may be used during the coating operation, depending to some extent on the gel selected, the amount of loading, etc. Mechanical, ultrasonic, or any other conventional means of agitation may be employed in the coating process.

The multi-chromatographic material of this invention is of particular utility as an efficient, one-step fractionation and enrichment means for the chromatographic analysis of mixtures containing PAH components, PCB isomers, chlorinated naphthalenes, and similar low-tolerance pesticidal and industrial chemicals which exist as pollutants in the environment. Such mixtures of compounds are often encountered in laboratory specimens in combination with natural materials including plant pigments and tissue and biological fluids and tissue, together with organic solvents, laboratory reagents and herbicides and insecticides which are not toxic to higher life forms. Heretofore, two or more chromatographic columns had been required to fractionate and isolate the components of such complex mixtures.

A specific application of this invention is in the separation of planar, polychlorinated biphenyls from a mixture which also includes at least one non-planar, polynuclear aromatic hydrocarbon, such as the widely used mirex. Such chemicals, either individually or in combination, have been suspected of being responsible for a large number of fish kills but have not been amenable to quick and easy or standardized separation techniques in analytical laboratories. This is because the admixture of PCB components with non-planar aromatic components results in erroneous and, thus, inconclusive analyses.

The invention will now be more specifically illustrated by the following examples:

EXAMPLE I

Spheres of a commercially available cross-linked styrene-divinyl benzene copolymer, Bio-Beads S-X3, are weighed and placed in a separatory funnel with approximately five times their volume of methylene chloride. After a swelling period of several hours, AMOCO brand powdered carbon equivalent to 10% of the weight of the spheres (w/w) is added and the mixture is mechanically agitated. The mixture is thereafter allowed to settle at which time most of the methylene chloride together with excess carbon is drained off. FIG. 1 represents, at a 1000X magnification factor, a carbon coated gel polymer sphere produced in accordance with this example. To prepare the material for use in column chromatography, ethyl acetate is next added to the carbon coated spheres until they form a distinct bottom layer. The carbon coated Bio-Beads, having an average loading of 5% by weight carbon particles, are drained into a column for use.

EXAMPLE II

A 1 cm i.d. × 50 cm glass column is packed with a quantity of uncoated Bio-Beads S-X3 reserving a 6 cm length of the column which is filled with the carbon/S-X3 spheres prepared as set forth in Example I. An ethyl acetate/toluene/methanol (60/20/20, v/v/v) solvent system is percolated through the column at a flow rate set at 2 ml/min. A sample containing mirex (a non-planar pesticide), 3,4,3',4'-tetrachlorobiphenyl (a planar polychlorinated biphenyl) and salmon oil is then introduced into the column.

Figure 2:
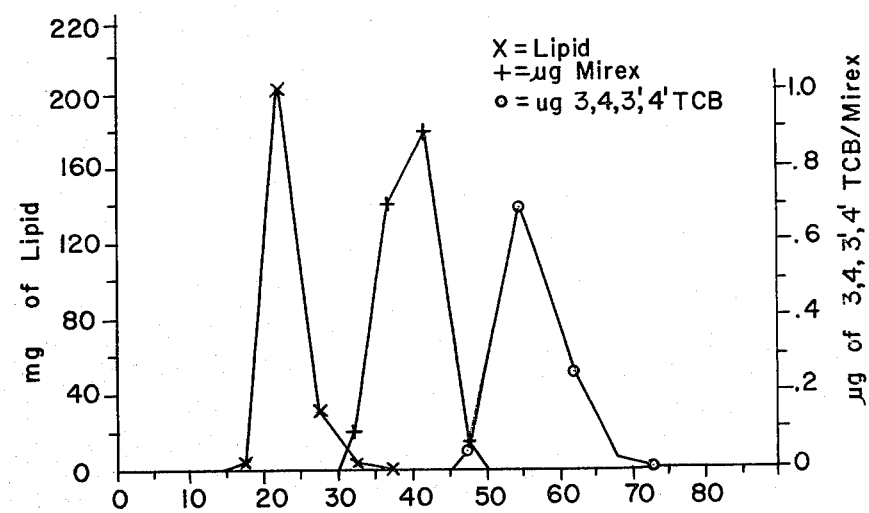
FIG. 2 is a graphical illustration of the elution profile resulting from passing a sample through a column containing the multi-chromatographic material of the present invention.

FIG. 2 is an elution profile of the sample showing the complete separation of the planar PCB component from the normally interfering lipid and almost complete separation of the PCB from mirex.

INDUSTRIAL APPLICABILITY

The multi-chromatographic materials of the present invention have considerable potential for use by the agricultural-industrial complex and governmental regulatory agencies in the cleanup and detection of synthetic chemical compounds found to be detrimental to the natural environment. More particularly, the materials should be applicable in such separations as hydrocarbons from polyaromatic hydrocarbons, halogenated aromatics from hydrocarbon solvents, planar PCB components from complex PCB mixtures, plant pigments from herbicides and insecticides, and aromatic pesticides from fish oil or tissues.

Although the invention has been described with regard to certain preferred embodiments, it should be understood that such modifications as would be obvious to one having skill in the art may be made without deviating from the scope of the invention which is defined by the appended claims.

We claim:

1. A process for the one-step separation and analysis of an organic mixture containing planar and nonplanar polynuclear aromatic hydrocarbon compounds comprising passing said mixture through a chromatographic column comprising a multi-chromatographic material consisting essentially of powdered carbon adhered to the surfaces of size exclusion gel particles consisting of a cross-linked copolymer of styrene and divinyl benzene.

2. The process of claim 1 wherein said copolymer is 3% cross-linked.

3. The process of claim 1 wherein said adhered carbon comprises up to about 5% by weight, based on the weight of said polymer particles.

4. The process of claim 1 wherein said planar polynuclear aromatic hydrocarbon compounds are planar polychlorinated biphenyls.

* * * * *